US012757314B2

(12) United States Patent
Yokota et al.

(10) Patent No.: US 12,757,314 B2
(45) Date of Patent: Oct. 6, 2026

(54) ELECTROMAGNET AND CHARGED PARTICLE ACCELERATOR

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Ryuki Yokota, Tokyo (JP); Yujiro Tajima, Yokohama Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 405 days.

(21) Appl. No.: 18/468,070

(22) Filed: Sep. 15, 2023

(65) Prior Publication Data

US 2024/0008165 A1 Jan. 4, 2024

Related U.S. Application Data

(63) Continuation of application No. PCT/JP2022/008972, filed on Mar. 2, 2022.

(30) Foreign Application Priority Data

May 14, 2021 (JP) ................................ 2021-082565

(51) Int. Cl.

| | |
|---|---|
| ***H05H 7/04*** | (2006.01) |
| ***H05H 7/00*** | (2006.01) |
| ***H05H 13/04*** | (2006.01) |

(52) U.S. Cl.

CPC .............. *H05H 7/04* (2013.01); *H05H 7/001* (2013.01); *H05H 13/04* (2013.01); *H05H 2007/046* (2013.01)

(58) Field of Classification Search

CPC .......... H05H 7/04; H05H 7/001; H05H 13/04; H05H 2007/045; H05H 2007/046

See application file for complete search history.

(56) References Cited

U.S. PATENT DOCUMENTS 5,117,194 A * 5/1992 Nakanishi .............. H05H 13/10 335/214
5,748,063 A * 5/1998 Crow ................. G01R 33/3875 324/319

(Continued)

FOREIGN PATENT DOCUMENTS

JP H03-055700 U 5/1991
JP H11339998 A * 12/1999

(Continued)

OTHER PUBLICATIONS

F. Saeidi et al., "Magnet design for an ultralow emittance storage ring", Physical Review Accelerators and Beams, Mar. 22, 2016, pp. 1-14, vol. 19, No. 032401 (14 pages).

(Continued)

*Primary Examiner* — Wyatt A Stoffa
(74) *Attorney, Agent, or Firm* — Foley & Lardner LLP

(57) ABSTRACT

To enable avoiding interference between a path of a separated charged particle beam and an electromagnet as well as providing a sufficient separation distance between: a path of a separated charged particle beam; and a path of a charged particle beam traveling in a main region. A quadrupole electromagnet includes: an iron core provided with a beam passing gap for travel of an output beam that is a separated charged particle beam, in addition to a main region for travel of a circulating beam that is a charged particle beam; excitation coils, and each wound around the iron core; a main vacuum duct, provided in a main region of the iron core, inside which the circulating beam travels; and a (Continued)

sub-vacuum duct, provided in the beam passing gap of the iron core, inside which the output beam travels.

5 Claims, 5 Drawing Sheets

(56) References Cited

U.S. PATENT DOCUMENTS

| | | | | |
|---|---|---|---|---|
| 9,095,040 | B2 * | 7/2015 | Balakin | H05H 7/10 |
| 9,153,409 | B2 * | 10/2015 | Wiedmann | H01J 35/147 |
| 10,548,212 | B2 * | 1/2020 | Aoki | H05H 13/04 |
| RE48,317 | E * | 11/2020 | Gall | H05H 13/02 |
| 12,148,592 | B2 * | 11/2024 | Price | H01J 37/141 |
| 2012/0313003 | A1 * | 12/2012 | Trbojevic | A61N 5/1081 250/396 ML |
| 2017/0339778 | A1 * | 11/2017 | Aoki | H05H 13/04 |
| 2026/0089830 | A1 * | 3/2026 | Nishida | H05H 7/10 |

FOREIGN PATENT DOCUMENTS

| | | |
|---|---|---|
| JP | 2007-035495 A | 2/2007 |
| JP | 2019-096543 A | 6/2019 |

OTHER PUBLICATIONS

International Search Report with English Translation of International Patent Application No. PCT/JP2022/008972 dated May 17, 2022 (5 pages).

Y. Ohnishi et al., “Upgrade Plan of KEKB”, Proceedings of 40th ICFA ABDW, Apr. 14, 2008, pp. 23-27, Novosibirsk, Russia (5 pages).

CN Office Action for Chinese Patent Application No. 202280022843.4 corresponding to the subject U.S. Application dated Mar. 9, 2026 (13 pages).

Chuang and Li, Eds., “Design and Development of the Accelerator for the Beijing Electron-Positron Collider II Upgrade Project,” Shanghai Scientific and Technical Press, Apr. 2015 (15 pages).

* cited by examiner

ELECTROMAGNET AND CHARGED PARTICLE ACCELERATOR

CROSS-REFERENCE TO RELATED APPLICATIONS

This application is a Continuation Application of No. PCT/JP2022/008972, filed on Mar. 2, 2022, and the PCT application is based upon and claims the benefit of priority from Japanese Patent Application No. 2021-082565, filed on May 14, 2021, the entire contents of which are incorporated herein by reference.

TECHNICAL FIELD

Embodiments of the present invention relate to an electromagnet and a charged particle accelerator provided with the electromagnet.

BACKGROUND

A charged particle accelerator is a device that accelerates charged particles such as electrons and protons to a high-energy state. Charged particle beams extracted from this charged particle accelerator are used in a wide range of fields, such as particle beam therapy for cancer, particle physics research, and development of new materials.

In the charged particle accelerator described above, a path and shape of the charged particle beam are mainly controlled by electromagnets. For example, in a synchrotron, as a charged particle accelerator, a charged particle beam is deflected by a magnetic field of a deflection electromagnet so as to circulate inside a vacuum duct installed in an annular shape, and the charged particle beam is prevented from diffusing by a quadrupole electromagnet and a sextupole electromagnet. In the beam output section of the synchrotron, charged particles are kicked out by an electrostatic deflector. This kicked out and separated beam of charged particles is deflected to the outside of the beam circulating path by a septum electromagnet and is sent to a beam transport system for utilizing the charged particle beam.

PRIOR ART DOCUMENTS

Patent Document

[Patent Document 1]
Japanese Utility Model Laid-Open No. 03-55700
[Patent Document 2]
Japanese Patent Laid-Open No. 2019-96543
[Patent Document 3]
Japanese Patent Laid-Open No. 2007-35495

SUMMARY

Problems to be Solved by the Invention

A beam output section 100 of a conventional synchrotron shown in FIG. 7 is configured so that an electrostatic deflector 101, a deflection electromagnet 102, a quadrupole electromagnet 103, and a septum electromagnet 104 are sequentially disposed. In this beam output section 100, only the charged particle beam to be output needs to be deflected by the magnetic field in the septum electromagnet 104. This requires a sufficient separation (separation distance) between the beam circulating path 1A of the circulating charged particle beam and the beam output path 1B of the charged particle beam to be output.

However, in the quadrupole electromagnet 103 (see FIG. 8) upstream of the septum electromagnet 104, the path of the charged particle beam is restricted within the vacuum duct 107 located in the central position of the iron core 106 around which the excitation coil 105 is wound. Therefore, the output beam 2B on the beam output path 1B must travel in the vicinity of the center of the quadrupole electromagnet 103 at a shallow angle close to the circulating beam 2A on the beam circulating path 1A. This requires a setting in which the length L0 of the straight line portion from the quadrupole electromagnet 103 to the septum electromagnet 104 is large in order to obtain a sufficient separation (separation distance) between the beam circulating path 1A and the beam output path 1B. This is a factor that reduces the design tolerance of the beam output section 100.

The embodiments of the present invention have been made in consideration of the above-mentioned circumstances, and an object of the present invention is to provide an electromagnet and a charged particle accelerator, capable of avoiding interference between a path of a separated charged particle beam and an electromagnet as well as providing a sufficient separation distance between: a path of a separated charged particle beam; and a path of a charged particle beam traveling in a main region.

DETAILED DESCRIPTION

Hereinafter, embodiments for carrying out the present invention will be described based on the drawings.

[A] First Embodiment (FIGS. 1 to 5)

Figure 1:
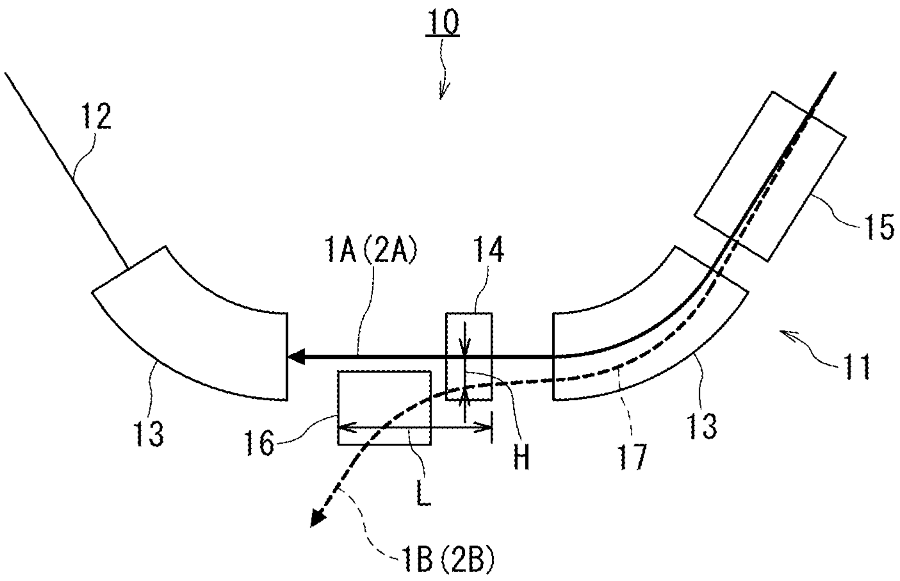
FIG. 1 is a plan view showing a beam output section of a synchrotron including a quadrupole electromagnet and a deflection electromagnet to which an electromagnet according to a first embodiment is applied.

FIG. 1 is a plan view showing a beam output section of a synchrotron including a quadrupole electromagnet and a deflection electromagnet to which the electromagnet according to the first embodiment is applied. The synchrotron 10, as a charged particle accelerator, circulates charged particles such as protons and electrons to accelerate them to a high-energy state. The synchrotron 10 includes a main vacuum duct 12, a deflection electromagnet 13, a quadrupole electromagnet 14, a sextupole electromagnet, and a high frequency acceleration cavity, the last two of which are not shown.

The main vacuum duct 12 is installed in an annular shape, inside which a charged particle beam travels. The deflection electromagnet 13 deflects the charged particle beam in the main vacuum duct 12 by the generated magnetic field, and circulates the charged particle beam in the main vacuum duct 12. The quadrupole electromagnet 14 and the sextupole electromagnet converge the charged particle beam within the main vacuum duct 12 and prevents the beam from diffusing. The high frequency acceleration cavity accelerates the charged particle beam that circulates and travels in the main vacuum duct 12. Here, the charged particle beam that circulates and travels in the main vacuum duct 12 is referred to as a circulating beam 2A, and its path is referred to as a beam circulating path 1A.

The charged particle beam accelerated by the synchrotron 10 is output from the beam output section 11 of the synchrotron 10 shown in FIG. 1 to a beam transport system (not shown). Through this beam transport system, the beam is guided to various devices for particle beam therapy, particle physics research, or the like. The above-described beam output section 11 is configured so that an electrostatic deflector 15, a deflection electromagnet 13, a quadrupole electromagnet 14, and a septum electromagnet 16 are sequentially disposed. The beam output section 11 further has a main vacuum duct 12 and a sub-vacuum duct 17.

The electrostatic deflector 15 kicks out charged particles of the circulating beam 2A circulating through the beam circulating path 1A. The charged particle beam kicked out by the electrostatic deflector 15 and separated from the beam circulating path 1A travels in the sub-vacuum duct 17, and is deflected in a direction away from the beam circulating path 1A by the magnetic field of the deflection electromagnet 13 to become an output beam 2B. The path of this output beam 2B is referred to as a beam output path 1B. The output beam 2B traveling in the sub-vacuum duct 17 is again deflected in a direction away from the beam circulating path 1A by the magnetic field of the quadrupole electromagnet 14, and further deflected in a direction away from the beam circulating path 1A by the septum electromagnet 16 to be sent to the beam transport system.

Figure 2:
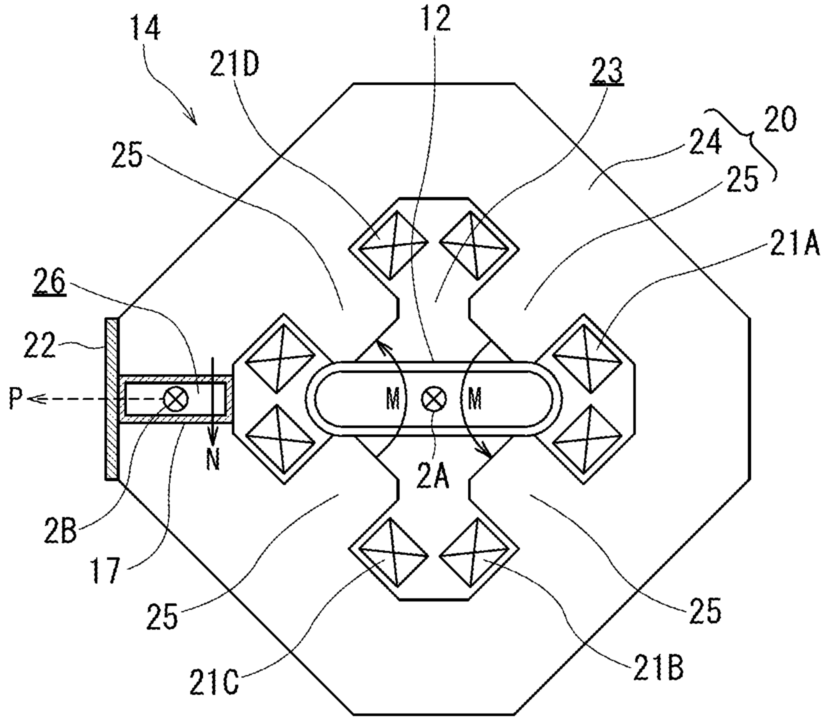
FIG. 2 is a front view showing the quadrupole electromagnet in FIG. 1.
Figure 3:
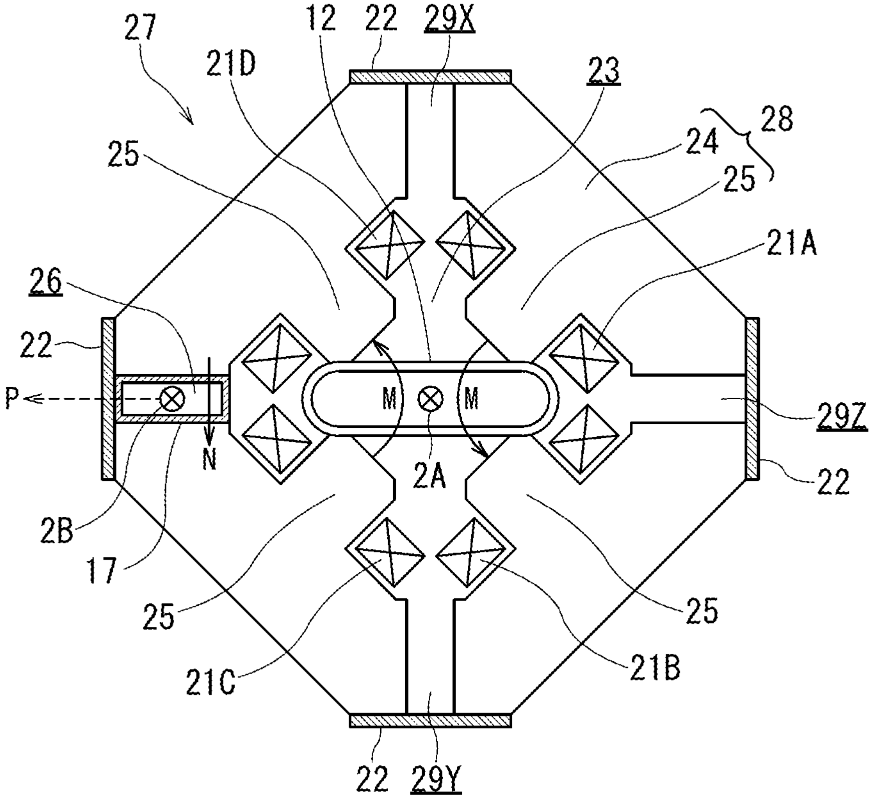
FIG. 3 is a front view showing a first modification of the quadrupole electromagnet shown in FIG. 2.
Figure 4:
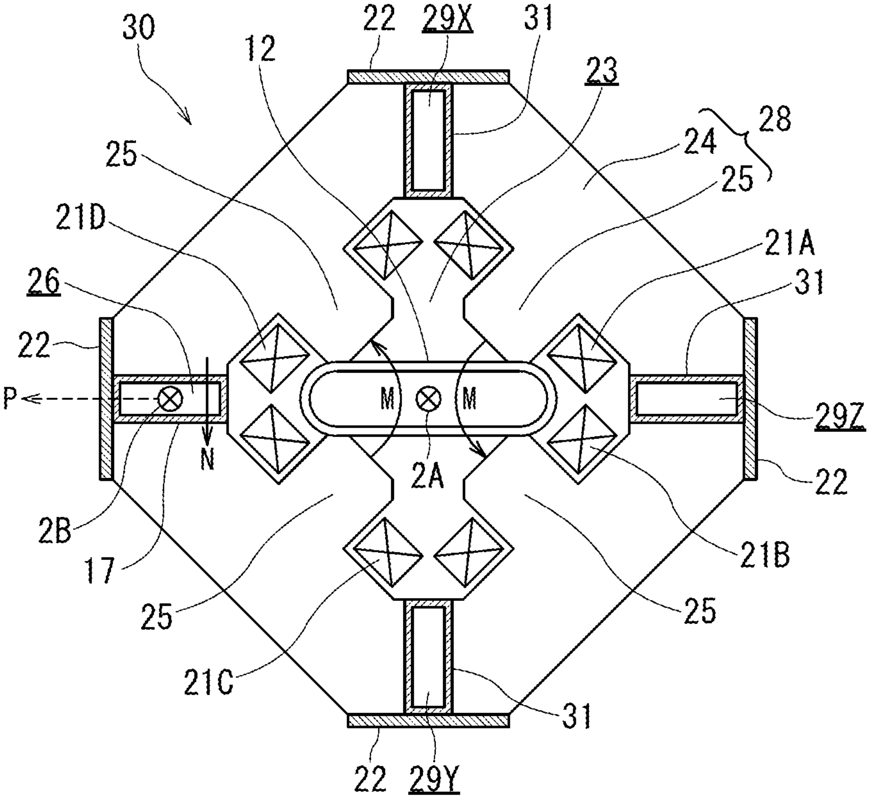
FIG. 4 is a front view showing a second modification of the quadrupole electromagnet in FIG. 2.
Figure 5:
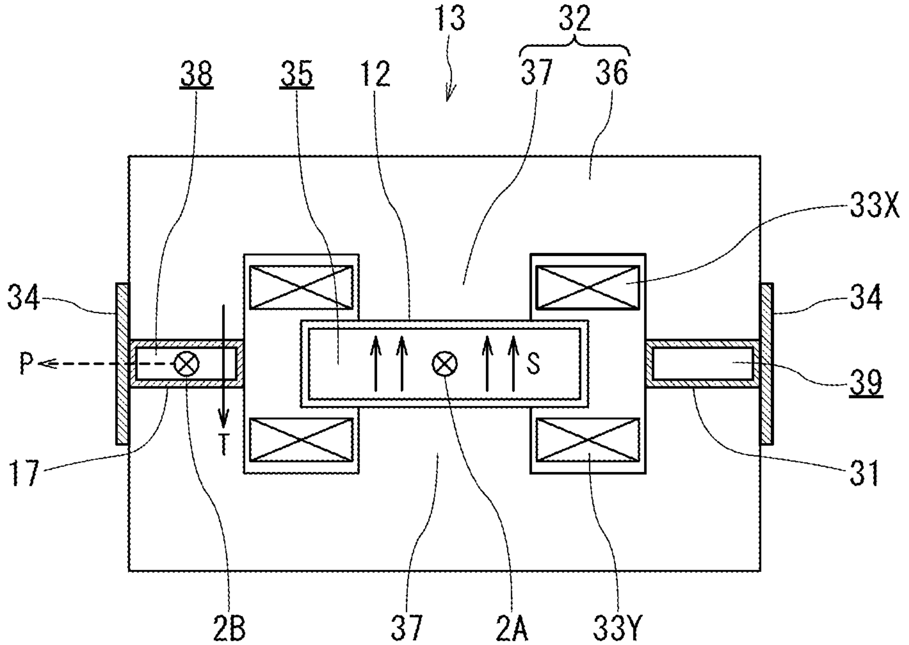
FIG. 5 is a front view showing the deflection electromagnet of FIG. 1.

The quadrupole electromagnet 14 in the beam output section 11 of the synchrotron 10 described above is shown in FIG. 2, its modifications are shown in FIGS. 3 and 4, and the deflection electromagnet 13 in the beam output section 11 is shown in FIG. 5.

The quadrupole electromagnet 14 shown in FIG. 2 has an iron core 20, excitation coils 21A, 21B, 21C and 21D, a support member 22, and further has the aforementioned main vacuum duct 12 and the sub-vacuum duct 17.

The iron core 20 of the quadrupole electromagnet 14 has a main region 23, which is a gap, formed at the central position of the rectangular shape in a front view. Further, the iron core 20 has four magnetic pole portions 25 protruding toward the main region 23 from a circumferential portion 24 facing the main region 23 at equal intervals, and a single beam passing gap 26 formed in the circumferential portion 24. The main region 23 is provided to allow the circulating beam 2A to travel, and the beam passing gap 26 is provided to allow the output beam 2B to travel.

Excitation coils 21A, 21B, 21C, and 21D are respectively wound around the four magnetic pole portions 25. Further, the support member 22 is fixed across a periphery of the beam passing gap 26 in the circumferential portion 24 of the iron core 20, that is, across a position facing the beam passing gap 26, and supports and reinforces the periphery of the beam passing gap 26 in the circumferential portion 24. This support member 22 is made of a non-magnetic material.

A main vacuum duct 12 is disposed in the main region 23 of the iron core 20, and the circulating beam 2A travels inside the main vacuum duct 12. The main vacuum duct 12 is made of a non-magnetic material, and the inside thereof is maintained in vacuum, thereby reducing beam loss for the traveling circulating beam 2A. The circulating beam 2A traveling in the main vacuum duct 12 is converged at the central position of the main vacuum duct 12 by the magnetic field M excited by the excitation coils 21A to 21D, and is prevented from diffusing.

The sub-vacuum duct 17 is disposed in the beam passing gap 26 of the iron core 20, and the output beam 2B separated from the beam circulating path 1A travels inside the sub-vacuum duct 17. The sub-vacuum duct 17 is made of a non-magnetic material and has an inside maintained in vacuum, so that the traveling output beam 2B is prevented from beam loss. The output beam 2B traveling in the sub-vacuum duct 17 is deflected in a direction P away from the beam circulating path 1A (circulating beam 2A) by the magnetic field N generated in the beam passing gap 26.

As described above, the iron core 20 formed with the main region 23 and the beam passing gap 26 has a shape, including the thickness, adjusted so as to maintain the symmetry of the magnetic field of the quadrupole electromagnet 14.

A quadrupole electromagnet 27 shown in FIG. 3 is a first modification of the quadrupole electromagnet 14. In this quadrupole electromagnet 27, an iron core 28 is formed with a main region 23 and a beam passing gap 26, and is formed with beam non-passing gaps 29X, 29Y, and 29Z at symmetrical positions of the beam passing gap 26. For example, the beam non-passing gap 29Z is formed at the position facing the beam passing gap 26, and the beam non-passing gaps 29X and 29Y are formed at positions 90 degrees apart from the beam passing gap 26 respectively in opposite directions. These beam non-passing gaps 29X, 29Y, and 29Z are gaps in which the charged particle beam does not travel (pass).

The beam non-passing gaps 29X, 29Y, and 29Z are formed in the same shape as the beam passing gap 26, thereby maintaining the symmetry of the magnetic field of the quadrupole electromagnet 27. Further, the iron core 28 has support members 22 respectively fixed across peripheries of the beam non-passing gaps 29X, 29Y, and 29Z, that is, respectively fixed across positions facing the beam non-passing gaps 29X, 29Y, and 29Z. The support members 22 respectively support and reinforce the peripheries of the beam non-passing gaps 29X to 29Z of the iron core 28.

The quadrupole electromagnet 30 shown in FIG. 4 is a second modification of the quadrupole electromagnet 14. This quadrupole electromagnet 30 has an iron core identical to the iron core 28 of the first modification. This iron core 28 has structures 31 respectively disposed in the beam non-passing gaps 29X, 29Y, and 29Z for maintaining the symmetry of the magnetic field of the quadrupole electromagnet 30 more strictly. Each structure 31 has a configuration similar to the sub-vacuum duct 17 disposed in the beam passing gap 26, and is formed into a tubular shape made of a non-magnetic material, for example.

The deflection electromagnet 13 shown in FIG. 5 has a configuration similar to the quadrupole electromagnet 30 of the second modification of the quadrupole electromagnet 14. In other words, the iron core 32, which has a rectangular shape in a front view, has a main region 35 formed at the central position thereof. The iron core 32 has a magnetic pole portions 37 protruding toward the main region 35 at positions opposite to each other in the circumferential portion 36 facing the main region 35. Excitation coils 33X and 33Y are respectively wound around the magnetic pole portions 37.

A beam passing gap 38 is formed in the circumferential portion 36 of the iron core 32, and a beam non-passing gap 39 is formed at a position opposite to this beam passing gap 38. The circumferential portion 36 of the iron core 32 has support members 34, made of a non-magnetic material, respectively fixed across peripheries of the beam passing gap 38 and the beam non-passing gap 39, that is, respectively fixed across positions facing the beam passing gap 38 and the beam non-passing gap 39. This support members 34 respectively support and reinforce the peripheries of the beam passing gap 38 and the beam non-passing gap 39 in the circumferential portion 36 of the iron core 32.

The main vacuum duct 12 is disposed within the main region 35 of the iron core 32, and the circulating beam 2A travels inside the main vacuum duct 12. The circulating beam 2A traveling in the main vacuum duct 12 is deflected in beam position by the magnetic field S excited by the excitation coils 33X and 33Y, and circulates in the main vacuum duct 12.

The sub-vacuum duct 17 is disposed in the beam passing gap 38 of the iron core 32, and the output beam 2B separated from the beam circulating path 1A travels inside the sub-vacuum duct 17. The output beam 2B traveling through the sub-vacuum duct 17 is deflected in a direction P away from the beam circulating path 1A (circulating beam 2A) by the magnetic field T generated in the beam passing gap 38. Furthermore, a structure 31 for strictly maintaining the symmetry of the magnetic field of the deflection electromagnet 13 is disposed in the beam non-passing gap 39 of the iron core 32.

With the configuration as above, the quadrupole electromagnets 14, 27, and 30 of the first embodiment achieves the following effects (1) and (2). The deflection electromagnet 13 also achieves effects similar to the quadrupole electromagnet 14 and the like.

Figure 7:
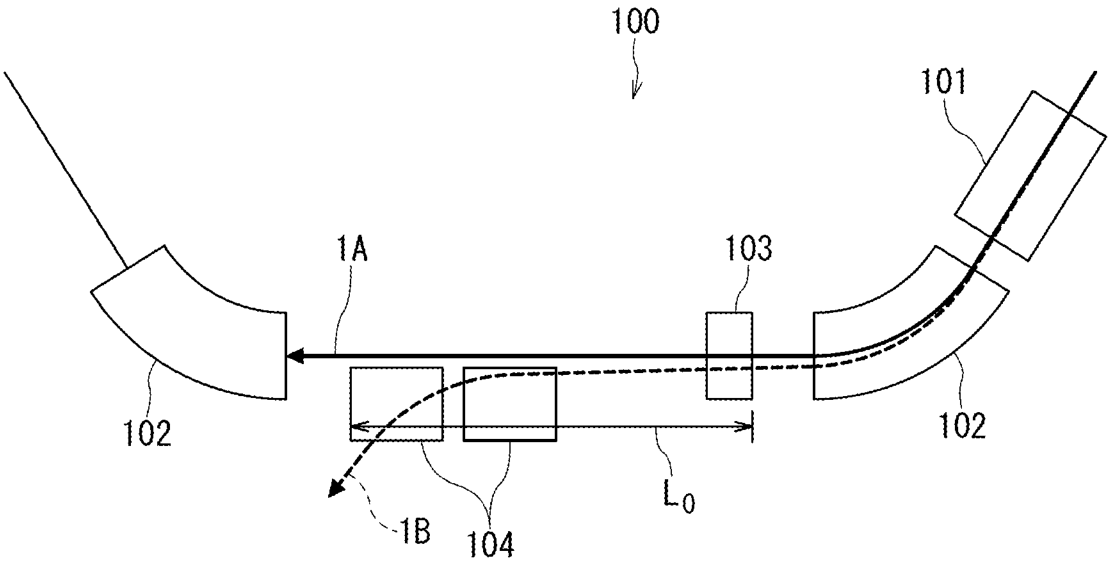
FIG. 7 is a plan view showing a beam output section of a conventional synchrotron.
Figure 8:
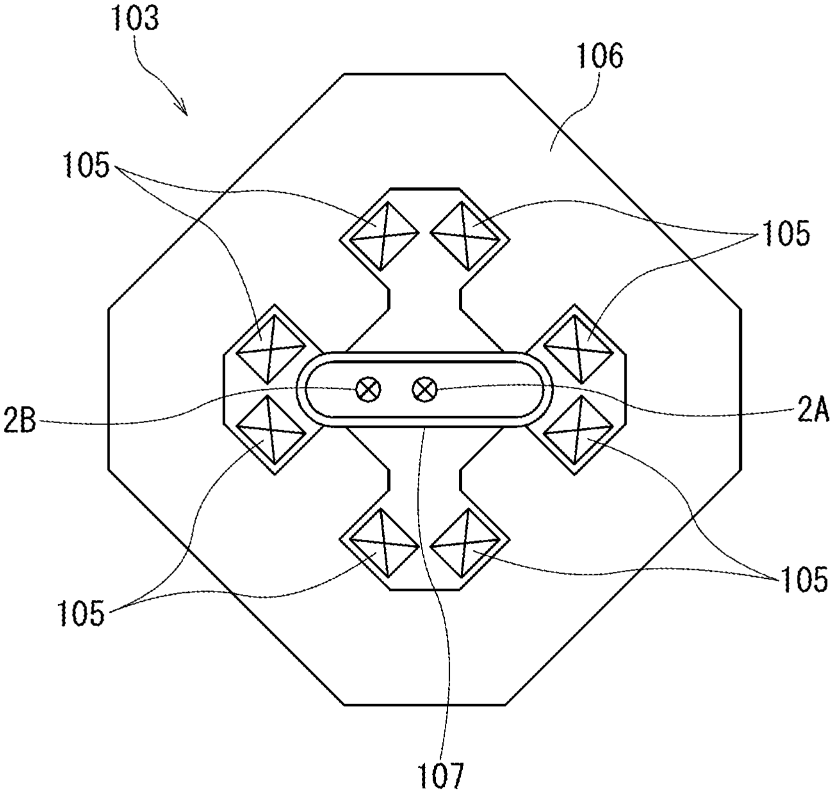
FIG. 8 is a front view showing a quadrupole electromagnet in FIG. 7.

(1) The iron cores 20 and 28 of the quadrupole electromagnets 14, 27, and 30 provided in the beam output section 11 of the synchrotron 10 are each provided with a beam passing gap 26 for travel of the output beam 2B, which is separated from the beam circulating path 1A for output, in addition to the main region 23 for travel of the circulating beam 2A. This enables avoiding interference between the beam output path 1B of the output beam 2B and each of the quadrupole electromagnets 14, 27, and 30, as well as providing a sufficient separation distance (separation) H, shown in FIG. 1, between the beam output path 1B of the output beam 2B in the sub-vacuum duct 17 and the beam circulating path 1A of the circulating beam 2A in the main vacuum duct 12. This result enables the synchrotron 10 to shorten the length L of the straight line portion from each of the quadrupole electromagnets 14, 27, and 30 to the septum electromagnet 16 in the beam output section 11, compared to the length L0 of the conventional straight line portion (FIG. 7). Therefore, the design tolerance of the beam output section of the synchrotron 10 can be improved.

(2) The output beam 2B in the sub-vacuum duct 17, which is separated from the beam circulating path 1A for output, travels through the beam passing gap 26 in each of the iron cores 20 and 28 of the quadrupole electromagnets 14, 27, and 30. At this time, the output beam 2B is deflected in a direction P away from the beam circulating path 1A on which the circulating beam 2A travels in the main vacuum duct 12 in the main region 23 of each of the iron cores 20 and 28 by the magnetic field N in beam passing gap 26. From this point of view as well, there can be provided a further sufficient separation distance (separation), H shown in FIG. 1, between the beam output path 1B of the output beam 2B and the beam circulating path 1A of the circulating beam 2A. This result enables reduction or elimination of the septum electromagnet 16 installed in the beam output section 11 of the synchrotron 10, allowing installation area of the synchrotron 10 to be reduced in combination with the shortening of the length L of the straight line portion in the beam output section 11.

Figure 6:
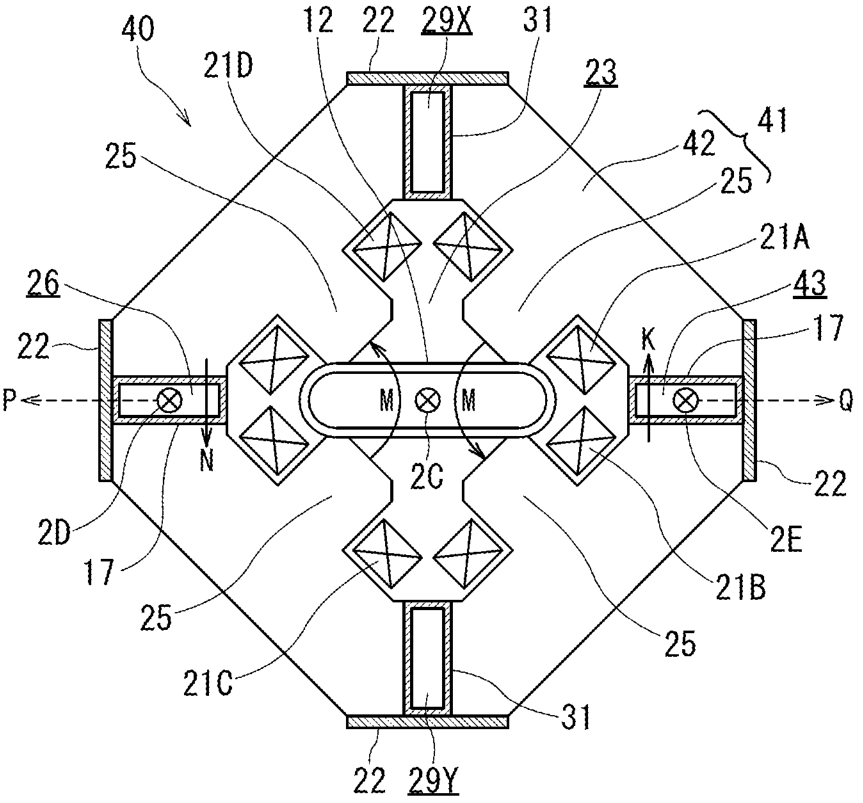
FIG. 6 is a front view showing a quadrupole electromagnet of a beam transport system to which an electromagnet according to a second embodiment is applied.

[B] Second Embodiment (FIG. 6)

FIG. 6 is a front view showing a quadrupole electromagnet of a beam transport system to which the electromagnet according to a second embodiment is applied. In this second embodiment, parts similar to the parts in the first embodiment are given the same reference numerals and characters as in the first embodiment to simplify or omit the explanation.

The quadrupole electromagnet 40, as an electromagnet of the second embodiment, is different from the first embodiment in the following points: the quadrupole electromagnet 40 is an electromagnet installed in the beam transport system; and the iron core 41 that configures this quadrupole electromagnet 40 has a circumferential portion 42 having a plurality of beam passing gaps, for example, two gapes (beam passing gaps 26 and 43) formed for travel of the charged particle beams 2D and 2E separated from a beam path 1C of the charged particle beam 2C.

In other words, the quadrupole electromagnet 40 includes an iron core 41, excitation coils 21A to 21D, and the support members 22, and further includes a main vacuum duct 12 and sub-vacuum ducts 17. The iron core 41 has the main region 23, which is a gap, formed at the central position of the rectangular shape in a front view. Further, the iron core 41 has four magnetic pole portions 25 protruding toward the main region 23 from the circumferential portion 42 facing the main region 23 at equal intervals, and the magnetic pole portions 25 respectively have excitation coils 21A, 21B, 21C, and 21D wound around.

The circumferential portion 42 of the iron core 41 has a beam passing gap 26 and a beam passing gap 43 respectively formed at positions opposite to each other, and has beam non-passing gaps 29X and 29Y formed facing each other. Further, the circumferential portion 42 of the iron core 41 has support members 22 respectively fixed across peripheries of the beam passing gaps 26 and 43 and the beam non-passing gaps 29X and 29Y, that is, respectively fixed across positions facing the beam passing gaps 26 and 43 and the beam non-passing gaps 29X and 29Y. The support members 22 respectively support and reinforce the peripheries of the beam passing gaps 26 and 43 and the beam non-passing gaps 29X and 29Y in the circumferential portion 42 of the iron core 41.

The main vacuum duct 12 is disposed within the main region 23 of the iron core 41, and the charged particle beam 2C travels inside this main vacuum duct 12. The charged particle beam 2C traveling in the main vacuum duct 12 is converged at the central position of the main vacuum duct 12 by the magnetic field M excited by the excitation coils 21A to 21D, and is prevented from diffusing. The path of this charged particle beam 2C is a beam path 1C.

The sub-vacuum ducts 17 are respectively disposed in the beam passing gaps 26 and 43 of the iron core 41, and the charged particle beams 2D and 2E separated from the beam path 1C respectively travel inside these sub-vacuum ducts 17. The path of this charged particle beam 2D is a beam path 1D, and the path of this charged particle beam 2E is a beam path 1E.

Charged particle beam 2D traveling inside the sub-vacuum duct 17 disposed in the beam passing gap 26 is deflected in a direction P away from the beam path 1C (charged particle beam 2C) by the magnetic field N generated in the beam passing gap 26. Charged particle beam 2E traveling inside the sub-vacuum duct 17 disposed in the beam passing gap 43 is deflected in a direction Q away from the beam path 1C (charged particle beam 2C) by the magnetic field K generated in the beam passing gap 43. Here, the separating direction Q is, for example, the opposite direction to the separating direction P.

With the configuration as above, the second embodiment achieves the following effect (3).

(3) The iron core 41 of the quadrupole electromagnet 40 is provided with a plurality of beam passing gaps (beam passing gaps 26 and 43) respectively for travel of the charged particle beams 2D and 2E separated from the beam path 1C of the charged particle beam 2C, in addition to the main region 23 for travel of the charged particle beam 2C. This enables avoiding interference between: the beam path 1D of the separated charged particle beam 2D and the beam path 1E of the separated charged particle beam 2E; and the quadrupole electromagnet 40, as well as providing: a sufficient separation distance between the beam path 1D of the charged particle beam 2D and the beam path 1C of the charged particle beam 2C; and a sufficient separation distance between the beam path 1E of the charged particle beam 2E and the beam path 1C of the charged particle beam 2C.

Therefore, each charged particle beam (for example, each of charged particle beams 2D and 2E) can be deflected in different directions by selecting the beam passing gaps 26 and 43 in which each charged particle beam should travel with this quadrupole electromagnet 40. As a result, charged particle beams (for example, charged particle beams 2D and 2E) can be simultaneously branched into different directions by one quadrupole electromagnet 40.

Several embodiments of the present invention have been described above, but these embodiments are presented as examples and are not intended to limit the scope of the invention. These embodiments can be implemented in various other forms, and various omissions, substitutions, and changes can be made without departing from the gist of the invention, and those substitutions and changes are included in the scope and gist of the invention, and are included in the scope of the invention described in the claims and their equivalents.

The invention claimed is:

1. An electromagnet comprising:

an iron core provided with at least one beam passing gap for travel of a separated charged particle beam, in addition to a main region for travel of the charged particle beam;

an excitation coil wound around the iron core;

a main vacuum duct, provided in the main region of the iron core, inside which the charged particle beam travels; and a sub-vacuum duct, provided in the at least one beam passing gap of the iron core, inside which the separated charged particle beam travels, wherein:

the iron core is provided with a plurality of beam non-passing gaps through which the charged particle beam does not travel;

each of the plurality of beam non-passing gaps is provided with a structure similar in configuration to the sub-vacuum duct provided in the at least one beam passing gap;

a total number of the at least one beam passing gap and the plurality of beam non-passing gaps is four; and the at least one beam passing gap and the plurality of beam non-passing gaps are positioned at 90° angular intervals on a circumference centered on the main vacuum duct.

2. The electromagnet according to claim 1, wherein the iron core is provided with a plurality of beam passing gaps.

3. The electromagnet according to claim 1, wherein the iron core has at least one support member, disposed thereon, for respectively supporting a periphery of the at least one beam passing gap or a periphery of at least one beam non-passing gap.

4. A charged particle accelerator comprising an electromagnet according to claim 1.

5. The electromagnet according to claim 3, wherein the at least one support member is made of a non-magnetic material.

* * * * *